United States Patent [19]

Chipchase

[11] 4,237,763
[45] Dec. 9, 1980

[54] APPARATUS FOR SLICING OR SCORING MUFFINS

[75] Inventor: Frank D. Chipchase, West Milford, N.J.

[73] Assignee: International Multifoods Corporation, Minneapolis, Minn.

[21] Appl. No.: 21,640

[22] Filed: Mar. 19, 1979

Related U.S. Application Data

[63] Continuation of Ser. No. 893,925, Apr. 6, 1978, abandoned.

[51] Int. Cl.³ .......................... A21C 15/04; B26D 3/30
[52] U.S. Cl. ........................................ 83/872; 83/887; 83/410; 83/418
[58] Field of Search ................. 83/872, 887, 861, 410, 83/418

[56] References Cited

U.S. PATENT DOCUMENTS

| | | |
|---|---|---|
| 1,766,450 | 6/1930 | Ost . |
| 1,879,796 | 9/1932 | Ehrlich . |
| 1,939,279 | 12/1933 | Rogalewski . |
| 1,953,558 | 4/1934 | Harrild et al. . |
| 2,235,546 | 3/1941 | Ahrndt. |
| 2,263,869 | 11/1941 | Bundschu ............................ 83/887 |
| 2,347,007 | 4/1944 | Tod . |
| 2,361,615 | 10/1944 | Elrod .................................... 83/872 |
| 2,686,542 | 8/1954 | Schmidt ................................ 83/872 |
| 2,803,279 | 8/1957 | Strand . |
| 3,192,976 | 7/1965 | Clock . |
| 3,669,165 | 6/1972 | Tobey et al. . |
| 3,692,077 | 9/1972 | Noel . |
| 3,704,735 | 12/1972 | Noel et al. |
| 3,877,330 | 4/1975 | Noel . |
| 3,995,515 | 12/1976 | White . |
| 4,002,091 | 1/1977 | White . |
| 4,015,492 | 4/1977 | Terragnoli . |

OTHER PUBLICATIONS

Alto Corp. Brochure showing models AM-300; CMS-300 and SAS-150.

*Primary Examiner*—Donald R. Schran
*Attorney, Agent, or Firm*—Merchant, Gould, Smith, Edell, Welter & Schmidt

[57] ABSTRACT

Apparatus is disclosed for slicing or scoring bakery products which comprises a stationary horizontal bed over which muffins or other bakery products are sequentially moved at high speed. Movement of the muffins is effected by first and second endless conveyor belts, each having a flight disposed adjacent the stationary bed and in opposition to the other. A hold down plate is suspended in overlying relation to the stationary bed, so that travel of the bakery products is bounded on the top and bottom by stationary surfaces, and on the sides by the conveyor belts. A disc cutting blade rotating at high speed projects into this travel space (in the preferred embodiment, one of the conveyor belts comprises dual belts which are spaced apart to permit projection of the blade therebetween), and the scoring or slicing function occurs as the bakery products move sequentially in slicing engagement with the rotating blade. The blade operates in a plane that is substantially parallel with the stationary bed and spaced above it an amount which determines the position of the slice on the product. Circular bakery products such as English muffins are controllably rotated as they pass through the disc cutting blade. This is accomplished by operating one conveyor belt in the forward direction and the other conveyor belt in the opposite direction, so that the muffins move forward sequentially at a predetermined linear speed and rotated at the same time, both as a function of belt speed differential. Means are provided for adjusting both the depth of the cut into the product as well as the position of the cut in the product.

16 Claims, 17 Drawing Figures

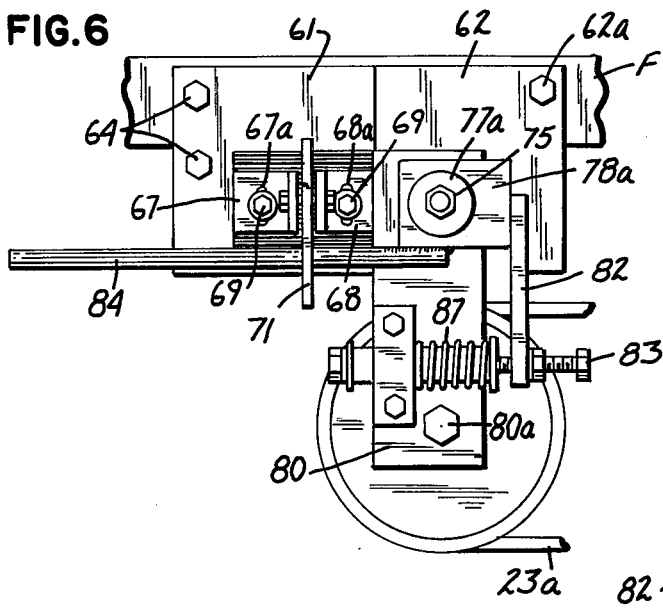
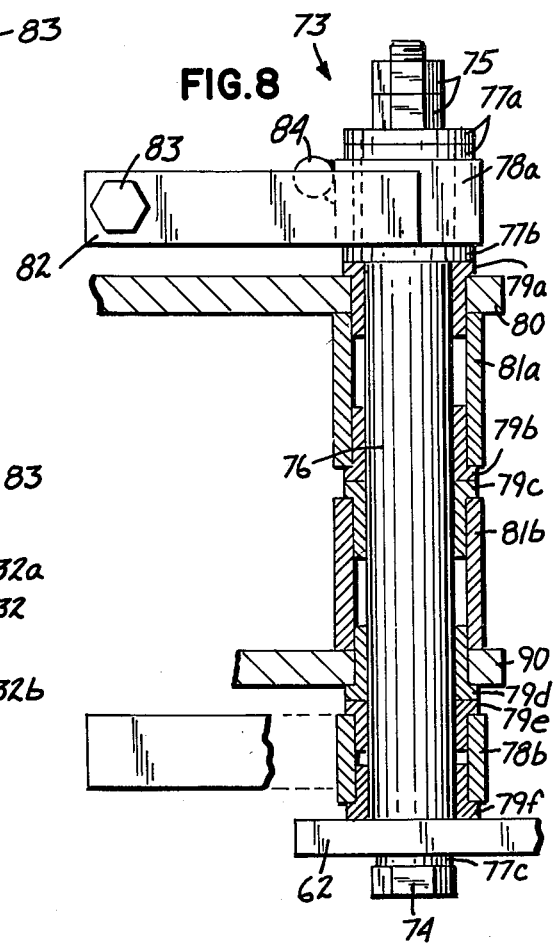
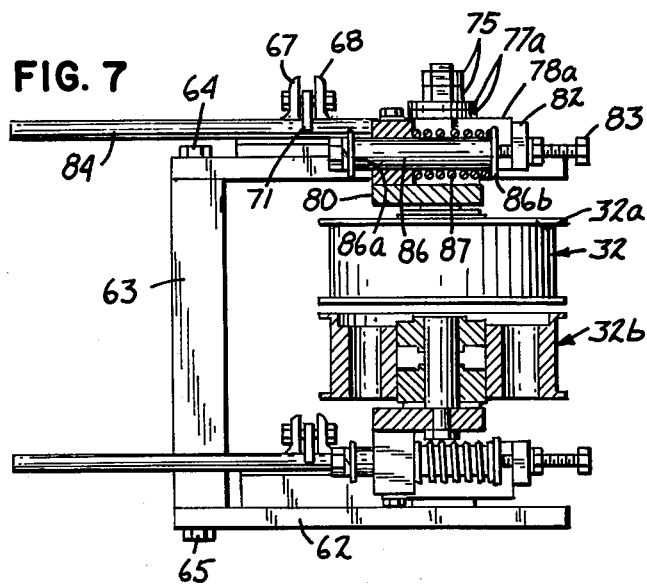
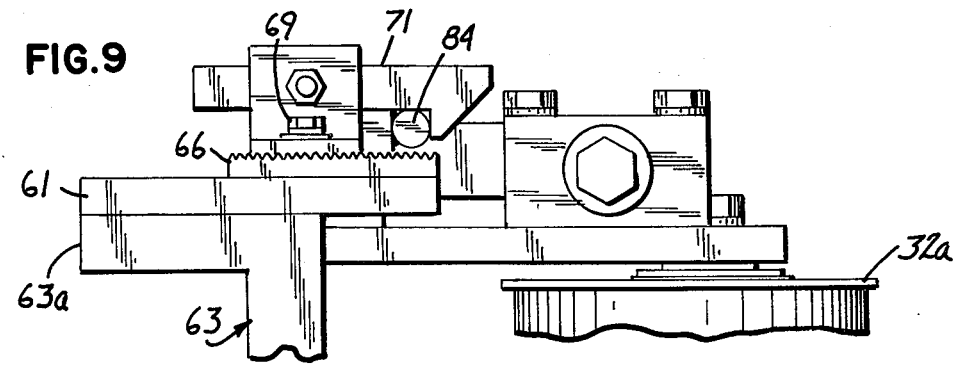

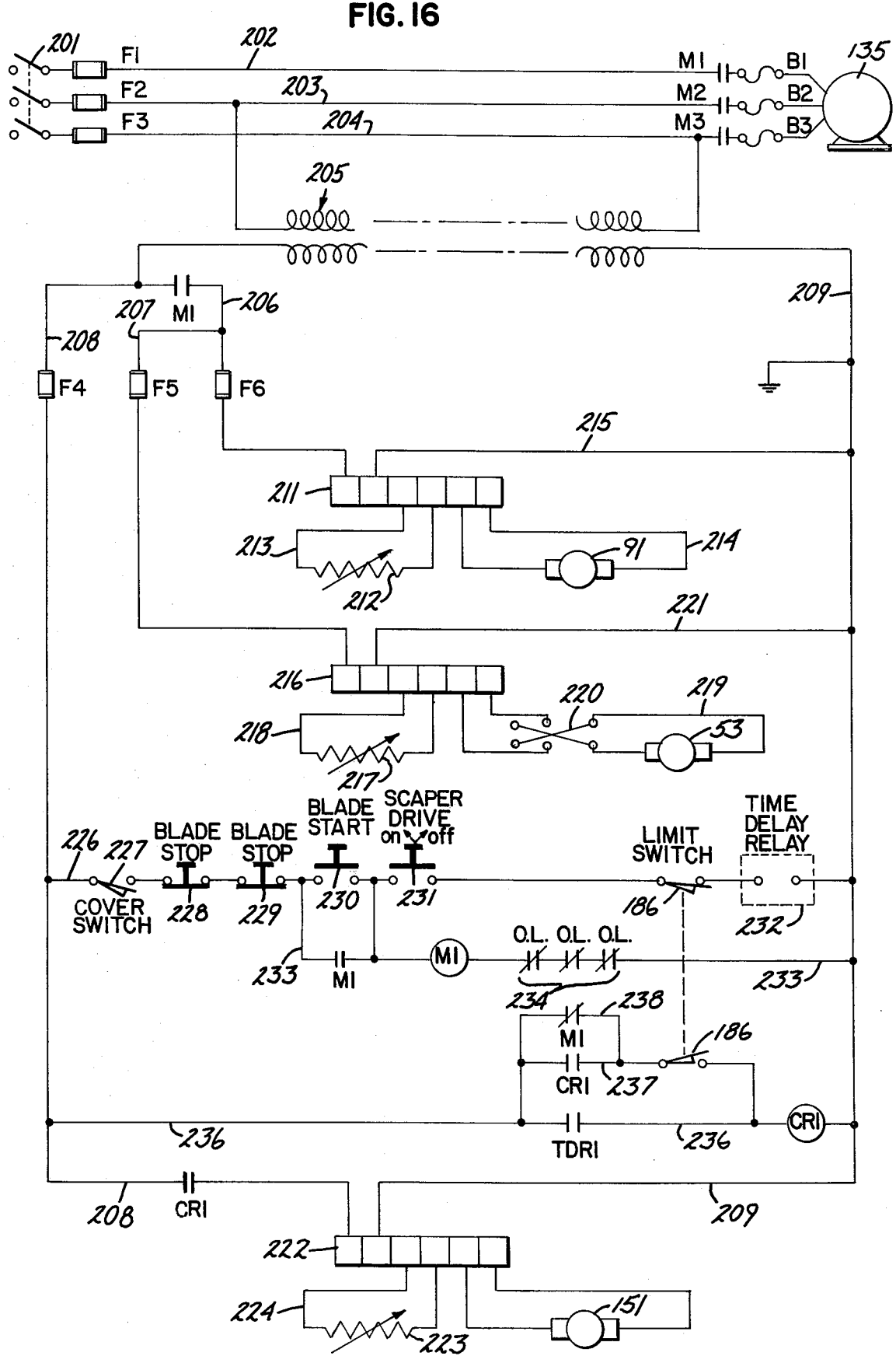

APPARATUS FOR SLICING OR SCORING MUFFINS

This is a continuation of application Ser. No. 893,925, filed Apr. 6, 1978, now abandoned.

The invention is directed to a machine for slicing or scoring products.

In facilities where bakery products are produced in substantial quantities, scoring or slicing the products is an essential step prior to packaging. It is necessary for the products to be sliced quickly and efficiently, and without restricting the aspect of the production. In accomplishing this, the bakery products must be handled firmly and uniformly to insure regularity of the slice, but at the same time they must be handled carefully to prevent damage. The problems attendant with slicing are particularly difficult with products such as English muffins, which are generally disc shaped and require special handling where either full slicing or peripheral scoring is desired.

The machine embodying this invention accomplishes these general objectives and also offers a number of specific features. The machine is provided with a stationary horizontal bed over which the bakery products may be sequentially moved at high speed. Product movement is effected by first and second endless conveyor belt, each having a flight disposed adjacent the stationary bed and in opposition to the other. A hold-down plate is suspended in overlying relation to the stationary bed, so that travel of the bakery products is bounded on the top and bottom by stationary surfaces, and on the sides by the conveyor belts.

A disc cutting blade rotating at high speed projects into this travel space, and the scoring or slicing function occurs as the bakery products move sequentially into slicing engagement with the rotating blade. The blade operates in a plane that is substantially parallel with the stationary bed and spaced above it an amount which determines the position of the slice on the product. The bed elevation is adjustable to vary the position of the cut.

In order for the bakery products to be efficiently handled both before and after the slice, one of the conveyor belts is designed so that the disc cutter blade is able to project laterally therethrough into the bakery product travel space. This is accomplished with dual belts that travel in the same vertical operating plane, but are spaced apart an amount sufficient to permit the disc cutting blade to project therebetween. In this manner, the product can be held by the dual belt both above and below the slice after engagement with the disc cutting blade, which maintains product integrity.

For bakery products such as English muffins, the problem of slicing is solved by controllably rotating the muffin on the stationary bed as it passes through the disc cutting blade. This is accomplished by operating one conveyor belt in the forward direction at a first linear velocity, and the other conveyor in the opposite direction at a second linear velocity less than the first velocity. In this manner, the muffins move forward sequentially at a predetermined linear speed which is a function of belt speed differential, and at the same time they are rotated, also as a function of belt speed differential. In this manner, the muffin may be rotated 360° as it passes through the disc cutting blade; and, depending on the lateral projection of the blade in the travel space, the resulting cut may be a full slice, or a circumferential score.

Means are included for externally adjusting the lateral projection of the disc cutting blade to vary the depth of slice. The adjustment is also capable of retracting the blade from the travel space so that no cut is made.

The machine is provided with various drive means and an electrical control circuit which permits the linear speed of each of the conveyor belts to be varied during operation by the machine operator. The control circuitry also permits the direction of the rearward moving conveyor belt to be reversed. With both conveyor belts adjusted to move forward at the same speed, oblong bakery products may be carried through the machine and either fully sliced or hinge sliced. It is also possible to retract the blade in this mode of operation for bakery products that do not require slicing, thus permitting the machine to be used as a simple conveyor without necessitating its removal from the production line.

Each of the conveyor belts is driven by a pulley system which includes a take-up mechanism that maintains the conveyor belt under proper tension as it operates. This mechanism is also operable to quickly and easily release the belt for replacement purposes.

The bakery products slicing machine is also provided with a device which automatically cleans both surfaces of the disc cutting blade on an intermittent basis.

BRIEF DESCRIPTION OF THE DRAWINGS

FIG. 6 is an enlarged fragmentary view in top plan of structure for maintaining the proper tension on one of the conveyor belt;

FIG. 7 is a fragmentary view in end elevation of the structure of FIG. 6;

FIG. 8 is a further enlarged view in side elevation of the belt tension structure of FIGS. 6 and 7 with portions thereof removed for purposes of clarity;

FIG. 9 is a further enlarged fragmentary view of portions of the belt tensioning structure as viewed from the side opposite that of FIG. 8;

FIG. 16 is a schematic representation of the electrical control circuit for the machine.

DESCRIPTION OF THE PREFERRED EMBODIMENT

Figure 1:
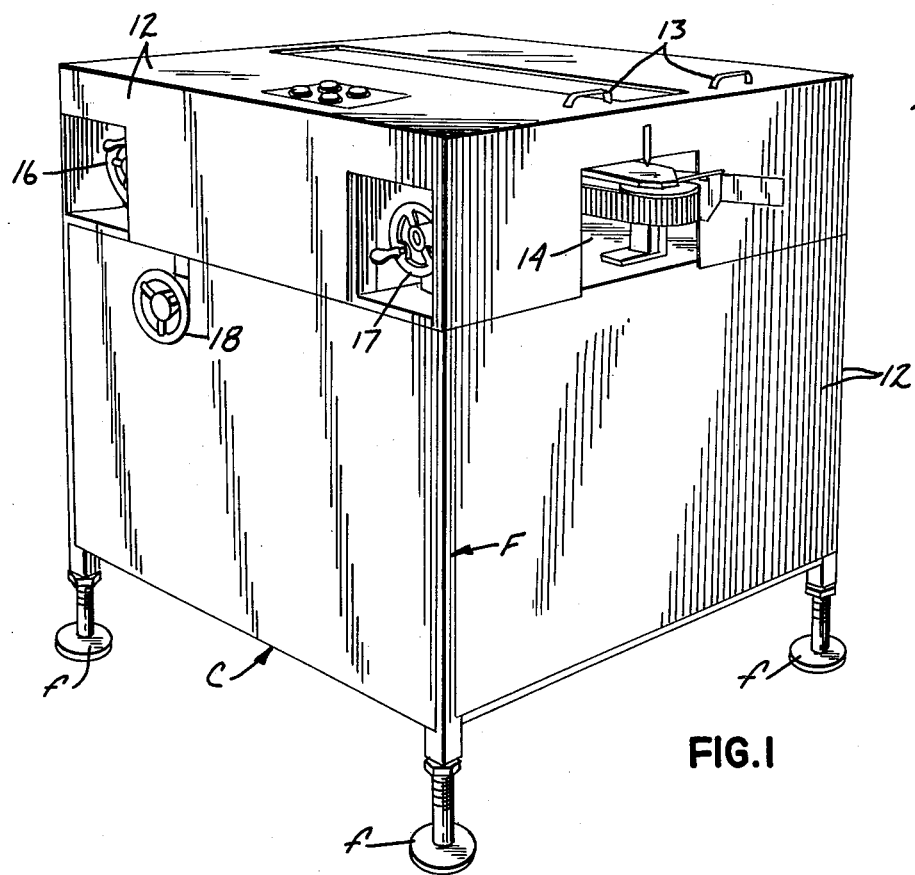
FIG. 1 is a perspective view of a machine for slicing bakery products which embodies the subject invention.

With initial reference to FIG. 1, a machine for slicing or scoring bakery products such as English muffins is represented generally by the numeral 11. Machine 11 comprises a frame F, only portions of which are shown in FIG. 1, having four feet f which are adjustable for leveling purposes. Various sheet metal panels 12 are secured to the frame F to serve as a protective enclosure.

The frame F and sheet metal panels 12 are subdivided into a main cabinet C and a counterbalanced hood H which is hinged on one side to provide access to the internal machine structure. Handles 13 secured to the front side of hood H assist in this function. A rectangular opening 14 formed on the front side of hood H serves as the product in-feed, and a similar opening on the back side of hood H serves as the product discharge, as will become apparent below.

A control panel 15 is mounted in the top of hood H in a position accessible to the machine operator.

Adjustment wheels 16, 17 are accessible from one side of the hood H, enabling the operator to adjust the position of one of the bakery product conveyor belts, as will become apparent below. An adjustment wheel 18 projecting from the side of the main cabinet C permits lateral adjustment of a disc cutter blade, as described in further detail below.

Figure 2:
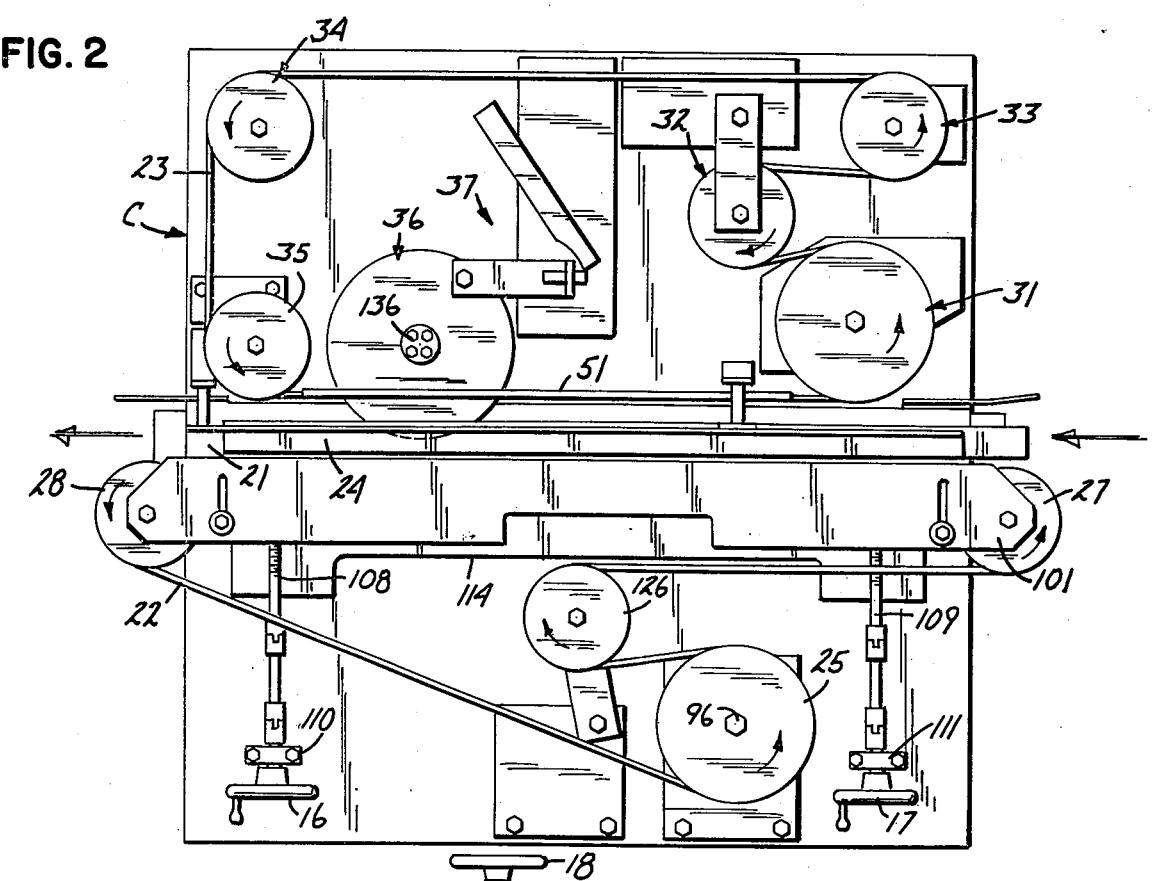
FIG. 2 is a view in top plan of the machine with the cover removed, showing in particular the structure and cooperation of first and second conveyor belts for carrying bakery products to the machine, a disc blade for slicing the bakery products, and a device for periodically cleaning the disc blade.

FIG. 2 is a view in top plan of the machine 11 with the hood H removed, showing much of the operating structure generally. For purposes of clarity, the frame F and other operational components of the machine 11 are not shown.

As represented by the arrows, the bakery products move from right to left over a stationary, horizontal bed 21 by a first conveyor belt 22 and a second conveyor belt 23 which, over the length of the bed 21, are disposed in opposed, substantially parallel relation. The lateral position of belt 22 relative to belt 23 may be varied by independent operation of the adjustment wheels 16, 17, which will be described in further detail below.

A hold-down plate 24 (see also FIG. 5) is disposed in overlying relation to the bed 21 and spaced therefrom to retain and guide the bakery products as they are sequentially moved over the stationary surface of the bed 21 by the conveyor belts 22, 23.

Conveyor belt 22 is endless, and driven by a drive pulley 25 around a take-up pulley 26 and a pair of idler pulleys 27, 28, which define the line of bakery product movement. As indicated by the arrows, conveyor belt 22 moves in the forward direction from the product in-feed to the product discharge area. The speed of conveyor belt 22 is variable, as will become apparent below.

Conveyor belt 23 is also endless, and driven by a drive pulley 31 around a take-up pulley 32 and idler pulleys 33–35. That portion of conveyor belt 23 extending between drive pulley 31 and idler pulley 35 also defines the line of bakery product movement. However, as indicated by the arrows on the pulleys 31–35, conveyor belt 23 moves in a direction opposite that of conveyor belt 22, and at a lesser linear velocity. As such, the bakery products, in this case circular English muffins, are carried forward at a speed which is a function of the difference in linear velocities between the conveyor belts 22, 23. At the same time, the muffins are rotated as a result of the opposite directional movement of the belts 22, 23, the rotational velocity of the muffins also depending on the difference between the linear velocities of the conveyor belts 22, 23.

The linear velocity of conveyor belt 23 can be varied, and its direction of movement can be reversed, both of these functions being accomplished by the electric control circuit described below.

Figure 5:
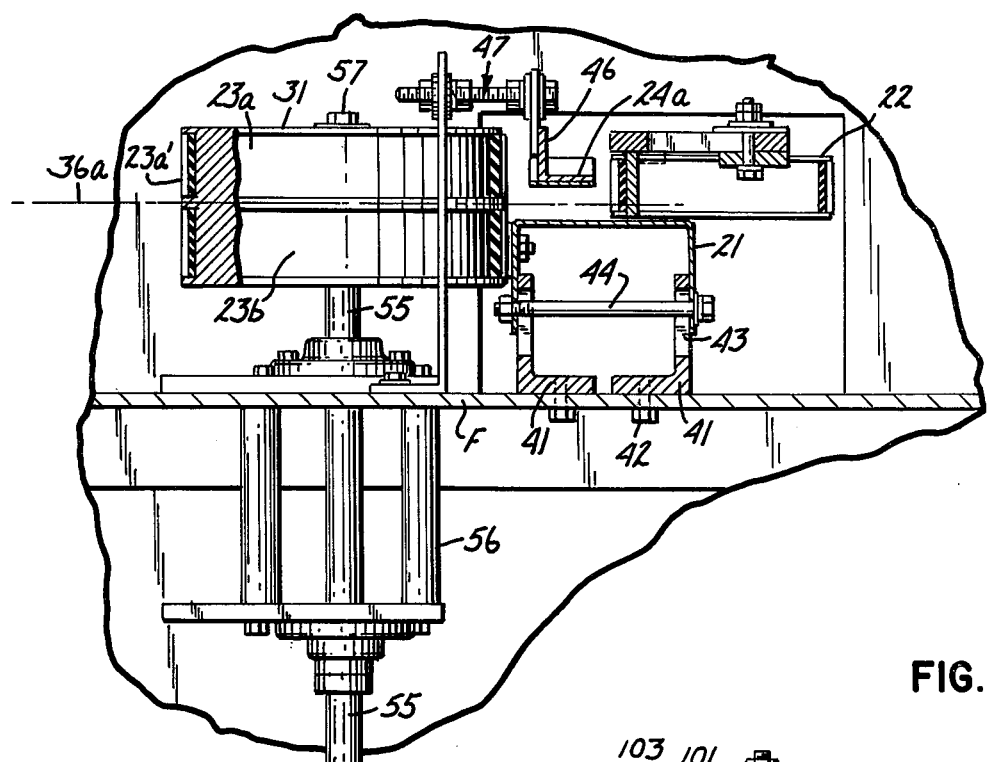
FIG. 5 is an enlarged fragmentary view in end elevation showing the relationship of the first and second conveyor belts, the disc blade, and the bakery products bed and hold-down.

With continued reference to FIG. 2, a disc cutter blade 36 is mounted for rotation about a vertical axis which is spaced from the bed 21. The diameter of disc cutter 36 is sufficiently large that the edge of the blade projects into the area between conveyor belts 22, 23 in a position that it slices or scores the bakery products as they are carried over the bed 21. With reference to FIG. 5, disc cutter blade 36 is disposed in a horizontal plane represented by the center line 36a, such plane being spaced above the top surface of bed 21. This distance determines the position where the bakery products are sliced. This position may be varied by adjusting the elevation of bed 21, which will be described below.

The lateral position of the disc cutter blade 36 relative to the conveyor belts 22, 23 and bed 21 can be varied to control the depth of slice.

Figure 12:
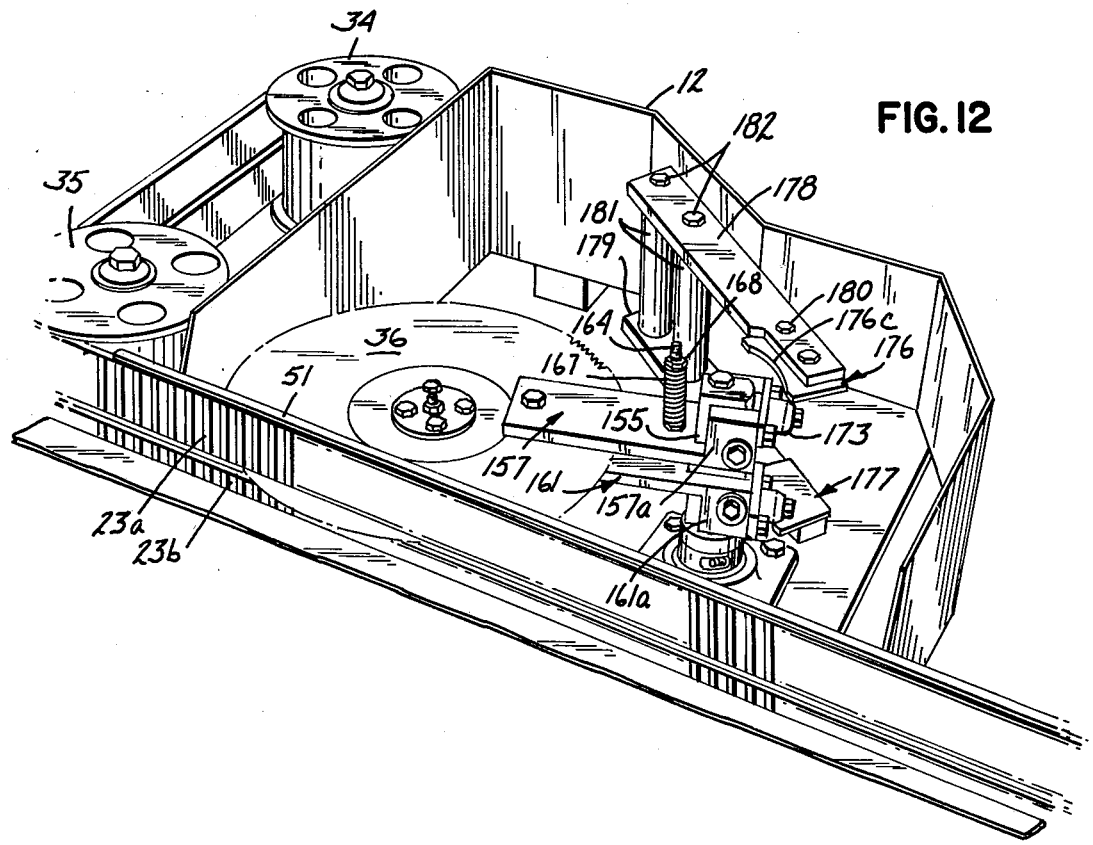
FIG. 12 is a perspective view of the disc blade and one conveyor belt, and showing in particular the structural device for periodically cleaning both sides of the disc blade.

The disc cutter blade 36 has a serrated peripheral edge (FIG. 12), and its thickness diminishes radially outward so that the slice removes as little of the bakery product as is possible.

With continued reference to FIG. 2, a device for cleaning both sides of the disc cutter blade 36 is represented generally by the numeral 37.

With reference to FIGS. 2, 4, 5 and 10, bed 21 comprises a thin stainless steel plate the length of which approximates the center-to-center distance between idler pulleys 27, 28. In transverse cross section (FIG. 5), bed 21 takes the form of an inverted U, defining a horizontal planar surface over which the bakery products move, and longitudinal, downwardly extending sides. Bed 21 is mounted on a plurality of pairs of opposed angle brackets 41 which are bolted to a portion of the frame F by bolts 42. The upwardly projecting leg of each angle bracket 41 has a vertical slot 43, and a mounting bolt 44 extending between the sides of the bed 21 is thus permitted to vary the elevation of the bed 21. Other structural means for varying the elevation of the top surface of bed 21 relative to the cutting blade 36 could be provided by the person of ordinary skill, depending on the application and how often bed adjustments are necessary.

A guide plate 45 (FIG. 4) is bolted to the side of bed 21 to guide the bakery products as they enter the conveying area. Although not shown, a similar guide may be included at the discharge end.

Figure 4A:
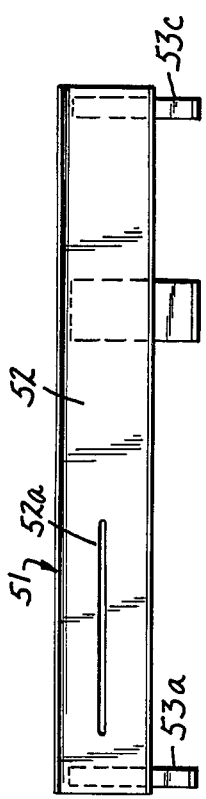
FIG. 4a is a view in side elevation of a guide for one of the conveyor belts.
Figure 4:
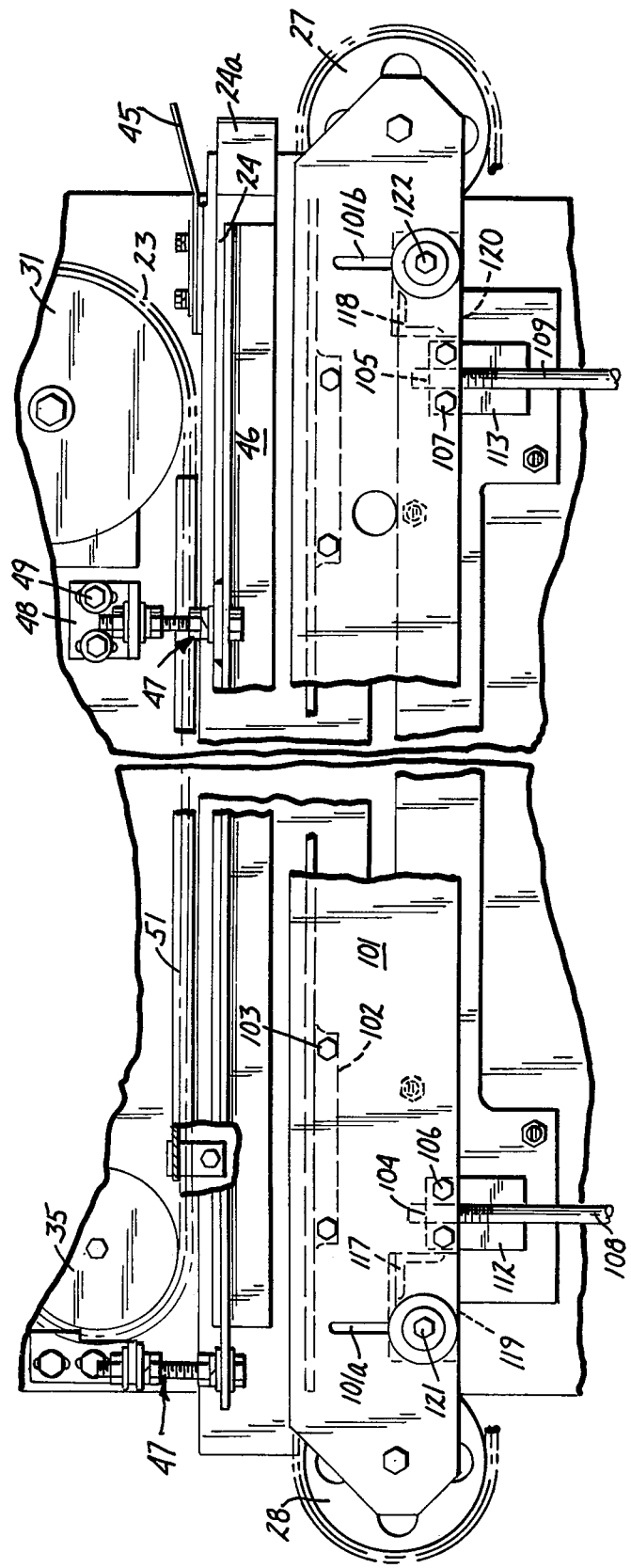
FIG. 4 is an enlarged fragmentary view in top plan of a portion of FIG. 2, showing in detail the structure and cooperation of the first and second conveyor belts, a laterally adjusting feature for one of the conveyor belts, the bed for supporting bakery products as they are moved through the machine and a hold-down plate for the bakery products that cooperates with the bed.

With reference to FIGS. 4 and 5, the hold-down plate 24 comprises a longitudinal stainless steel plate having an L-shaped transverse cross section, the entry end of which terminates in an upturned tab 24a that assists in guiding the bakery products into the conveying area. The hold-down plate 24 is backed by a longitudinal L-shaped bracket member 46. The vertical legs of both the hold-down plate 24 and bracket member 46 are secured together at the head end of nut and bolt sets 47. The opposite end of each of the nut and bolt sets 47 is secured to the upper end of a vertical support bracker 48. The base of each of the support brackets 48 is adjustably secured to the frame F adjacent the bed 21 by bolts 49. This adjustment is lateral in nature and permitted by the elongated mounting openings formed in the base of each support bracket 48, as shown in FIG. 4. Although not shown, similar slotted openings are provided in the respective components for the nut and bolt assemblies 47, permitting the hold-down plate 24 to be vertically, longitudinally and laterally adjusted to the dimensional requirements of the bakery product.

As described above, the disc cutter blade 36 projects laterally into the space through which the bakery products sequentially pass, which is defined at the bottom by the bed 21, at the top by the hold-down plate 24, and at the sides by the conveyor belts 22, 23. The bakery products are best carried if contact is made by the conveyor belt 23 both above and below the area in which it is sliced. With reference to FIG. 5, this is accomplished by providing a dual conveyor belt system which acts as a single conveyor belt, but which accommodates the lateral projection of disc cutter blade 36 between the dual belts, as represented by the cutting plane 36a.

The dual belt system comprises an upper conveyor belt 23a and a lower conveyor belt 23b, each of which is preferably externally ribbed (see reference numeral 23a' in FIG. 5) so that the belt has better frictional carrying capability. With reference to FIGS. 4 and 4a, a guide bearing the general reference numeral 51 is provided for the dual belts 23a, 23b between the drive pulley 31 and the idler pulley 35 to provide a backing for the dual belt system and insure that the dual belts travel in a straight line. Guide 51 comprises a longitudinal plate 52, the external face of which engages and guides the internal surface of belts 23a, 23b. A horizontal slot 52a is disposed and sized to receive the disc cutter blade 36. Brackets 53a, 53b and 53c project downwardly from the plate 52, and are bolted to the side of bed 21 to carry the guide 51 in the proper position.

The dual belts 23a, 23b are driven by an electric motor 53 suitably mounted to the frame F in a horizontal position. Motor 53 acts through a right angle gear drive 54 having an output shaft 55. With reference to FIG. 5, the shaft 55 is journaled in a spacer 56, from which it projects vertically upward to receive the drive pulley 31. Pulley 31 comprises a single structure defining separate recesses for the belts 23a, 23b, as shown in FIG. 5. Pulley 31 is secured to shaft 55 by a bolt 57.

FIGS. 6–9 show in detail the take-up pulley 32 for the dual belts 23a, 23b, as well as the structure for initially adjusting the dual belts and for maintaining the proper tension on the dual belts during operation.

FIG. 7 shows the take-up pulley 32 to comprise separate pulleys 32a, 32b which are independently suspended and adjusted, and for which separate tension mechanisms are provided.

The overall structure comprises an upper mounting plate 61 and a lower mounting plate 62 which are horizontally disposed and spaced apart by the distance of a spacer 63. Lower mounting plate 62 is rectangular in shape and secured directly to a part of the frame F by a plurality of mounting bolts 62a, one of which is shown in FIG. 6. Upper mounting plate 61 is substantially square and approximately one-half the size of lower mounting plate 62, and disposed in overlying relation thereto.

The spacer 63 is a vertical member having laterally extending legs 63a (one of which is shown in FIG. 9). The upper leg 63a is secured to the upper mounting plate 61 by bolts 64, and the lower leg 63a is secured to the lower mounting plate 62 by bolts 65.

A rectangular toothed plate 66 is secured to the top surface of upper mounting plate 61. A pair of L-shaped brackets 67, 68 have teeth on their bottom surfaces which cooperate with those of the tooth plate 66. The L-shaped brackets are provided with elongated adjustment slots 67a, 68a, permitting them to be mounted in opposed, fixed relation by mounting bolts 69.

FIGS. 6 and 7 show the vertical legs of the angle brackets 67, 68 to be spaced apart a predetermined amount, and an elongated dog member 71 disposed in this space. The dog 71 has a mounting opening formed therethrough. A mounting bolt 72 extends through the vertical legs of the brackets 67, 68 and the mounting opening, and holds the dog 71 firmly in place when tightened.

A pivot shaft assembly bearing the general reference numeral 73 is secured to the bottom mounting plate 62 by a mounting bolt 74 and nuts 75. The pivot shaft assembly 73 includes a vertical pivot shaft 76 through which the bolt 74 extends, and upon which a number of components are mounted. With reference to FIG. 8, these components comprise, from top to bottom, the nuts 75, washers 77a, an upper square collar 78a, a washer 77b, a bushing 79a, an upper pulley support bar 80, a spacer 81a, bushings 79b, 79c, a second spacer 81b, a lower pulley support bar 90, bushings 79d, 79e, a lower square collar 78b, a bushing 79f and a lock washer 77c.

A tension adjustment bar 82 is secured to the upper square collar 78a and projects outwardly therefrom. An adjustment bolt 83 is carried at the outer end of the adjustment bar 82.

An elongated rod 84 of circular cross section is also secured to one side of the upper square collar 78a, projecting laterally therefrom at an angle of 90° relative to the adjustment bar 82. As such, the square collar 78a, adjustment bar 82 and elongated rod 84 are capable of rotating together about the pivot shaft 76, if not otherwise restricted.

As shown in FIGS. 7 and 9, the elongated rod 84 is positioned for retaining engagement by the dog member 71, which serves to restrict rotational movement of these three components.

The upper pulley support bar 80 comprises a flat, rectangular bar, and the upper pulley 32a is rotatably suspended therebelow by a mounting bolt 80a.

A block 85 is mounted on edge on the top surface of the pulley support bar 80 and is bored to receive a plunger 86. A washer 86a (held in place by an axial bolt) serves as a retainer for one end of the plunger 86. A retainer 86b is formed at the opposite end. A coil spring 87 is mounted between the retainer 86b and the block 85.

With the elongated rod 84 retained by the dog number 71, the upper pulley support bar 80 is disposed in parallel relation with the tension adjustment bar 82, and the plunger 86 is disposed in colinear alignment with the adjustment bolt 83. With the adjustment bolt 83 engaging the plunger 86, it will be appreciated that a biasing force will be imparted on the upper pulley support bar and upper pulley 32a which is a function of the degree of compression of spring 87. See FIGS. 6 and 7. This force is disposed in opposition to the force created by the upper conveyor belt 23a (FIG. 6), and thus maintains the upper belt 23a at the proper degree of tension.

The belt adjustment and tensioning structure for the lower pulley 32b and lower conveyor belt 23b is virtually the same, although the position of some of the components are reversed for purposes of convenience. The reference numerals for the adjustment and tensioning mechanism for lower pulley 32b have therefore been deleted for purposes of clarity.

The mechanisms shown in detail in FIGS. 6-9 also serve to facilitate the removal and replacement of either of the dual conveyor belts 23a, 23b. For example, removal of the upper belt 23a is easily accomplished by initially pulling the rod 84 laterally toward the dog 72, which releases tension on the belt 23a. The dog 72 can then be pivoted upward manually out of retaining engagement with the rod 84. This permits the rod 84, upper collar 78a and adjustment bar 82 to be rotated together in a counterclockwise direction as viewed in FIG. 6, which permits the support bar 80 and pulley 32a to swing away from the tension maintaining position. Because the pulleys 32a, 32b are separate, the upper conveyor belt 23a is simply removed downwardly from the pulley 32a, and thereafter removed from the drive pulley 31 and idler pulleys 33, 34 and 35.

Conveyor belts of this type are generally not of identical length, and the adjustment components described above are used to insure that the proper degree of tension is placed on the belt 32a after replacement. Initially, the new belt 23a is placed around the upper pulley 32a, and the elongated rod 84 swung into a position where it may be retainably engaged by the dog 71 upon replacement of the bolt 72. In this regard, it will be noted that the position of the angle brackets 67, 68 on the toothed plate 68 (as permitted by the elongated slots 67a, 68a) permit significant adjustment to the "home" rotational position of the elongated rod 84, which permits the structure to adapt to conveyor belts of varying length. Once the general position of the elongated rod 84 is determined, further adjustments to effect the proper belt tension are accomplished by the adjustment bolt 83 acting on the plunger 86 and spring 87.

In this manner, the tension on each of the conveyor belts 23a, 23b may be accurately adjusted to insure optimum running conditions of the bakery product conveying system.

Figure 3:
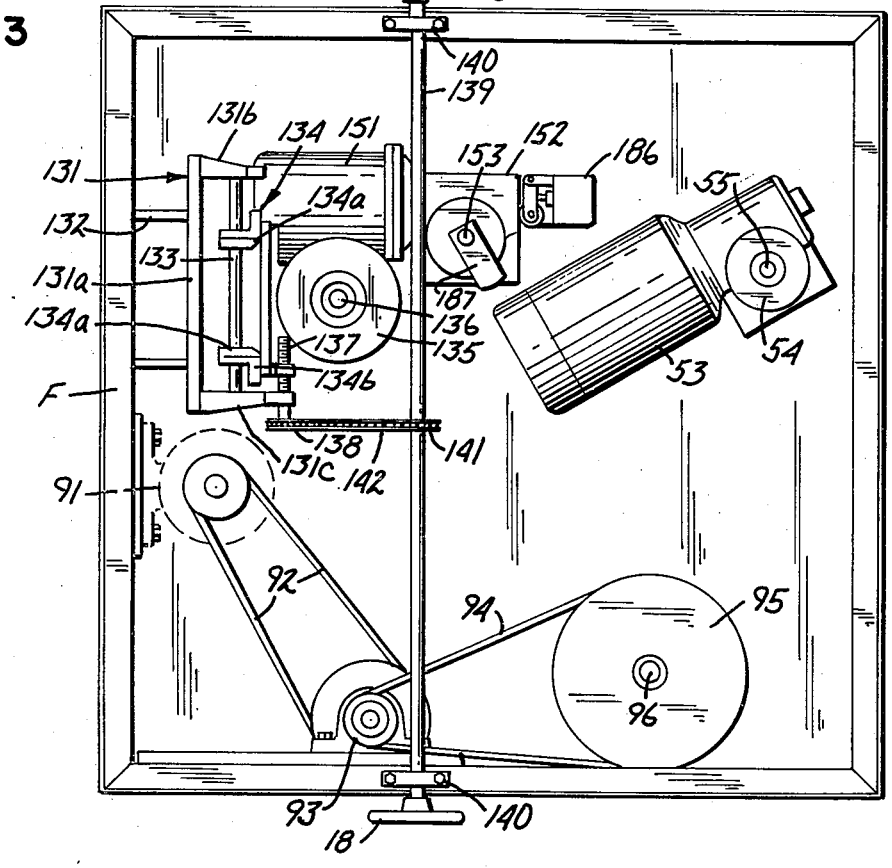
FIG. 3 is a view in top plan of the machine similar to FIG. 2 but viewed below, and showing in particular the drives for the first and second conveyor belts and the structural means for laterally adjusting the disc blade.

The conveyor belt 22 comprises a single belt (FIG. 5) that is of the same construction as the conveyor belts 23a, 23b. With reference to FIG. 3, th single conveyor belt 22 is driven by an electric motor 91 that is mounted to the side of the frame F. An endless belt 92 connects motor 91 with a speed increaser 93 that is mounted to the side of frame F. A second belt 94 connects the smaller pulley of the increaser 93 with a lower drive pulley 95 mounted on a drive shaft 96. Drive shaft 96 extends upward through a spacer not shown, but similar to the spacer 56 for the dual belt drive shaft 55, which is shown in FIG. 5. Drive pulley 25 (FIG. 2) is mounted on the top of shaft 96 in the same plane of operation as take-up pulley 26 and idler pulleys 27, 28.

The belt take-up and tension adjustment structure for the take-up pulley 26 is virtually the same as that for the take-up pulleys 32a, 32b and has therefore been omitted for purposes of clarity.

As generally described above, the single belt 22 is laterally adjustable relative to the dual belt 23 to accommodate bakery products of various sizes. With reference to FIGS. 2, 4, 10 and 11, this lateral adjustment is accomplished through structure which includes an elongated horizontal plate 101. The idler pulleys 27, 28 are rotatably mounted on the underside of plate 101 at each end so that their positions are fixed relative to each other. A longitudinal guide 102 is secured to the undersurface of plate 101 by bolts 103 in a position to guide and offer backing support to the single belt 22 as it moves from the idler pulley 27 to the idler pulley 28.

Figure 10:
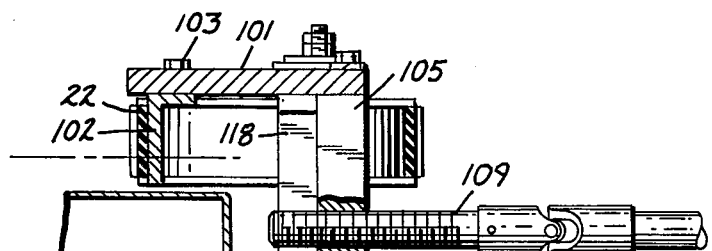
FIG. 10 is an enlarged fragmentary sectional view in side elevation of structural means for adjusting the lateral position of one conveyor belt relative to the other.
Figure 11:
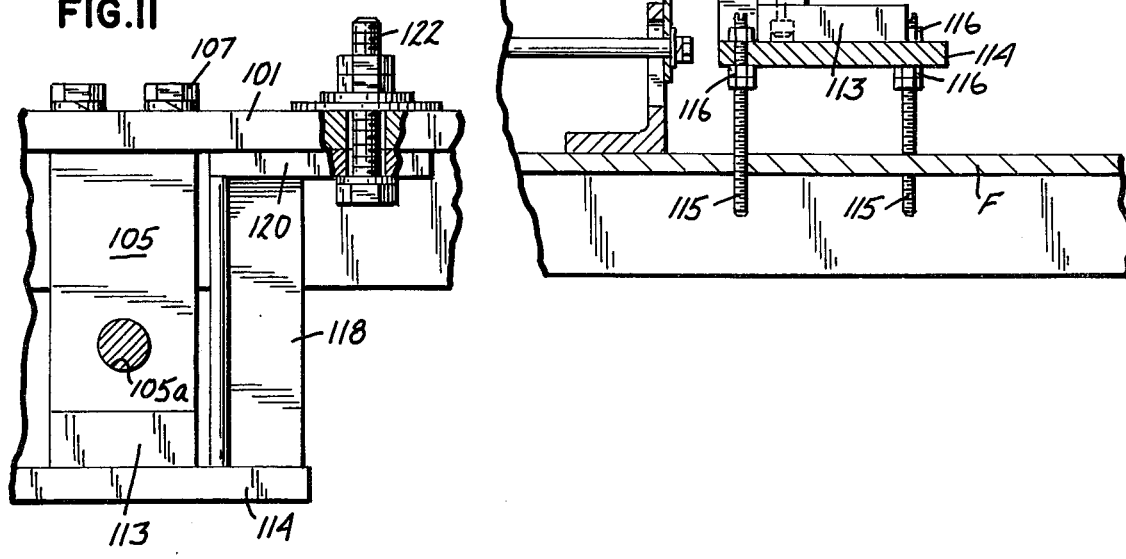
FIG. 11 is an enlarged fragmentary view of the belt adjusting structure of FIG. 10 shown from the front thereof.

A pair of adjustment blocks 104, 105 are secured to the undersurface of plate 101 in symmetrical relation by bolts 106, 107, respectively. The adjustment blocks 104, 105 are rectangular in shape, and project downwardly from a plate 101 as best shown in FIGS. 10 and 11. A horizontal, internally threaded bore is formed through each of the blocks 104, 105 (see reference numeral 105a in FIG. 11). These threaded bores respectively receive threaded adjustment shafts 108, 109. The shaft 108 is turned by the handle wheel 16, and its axial position is maintained by a retaining bearing 110. A similar bearing 111 serves the same purpose for shaft 109, which is rotated by the handle wheels 17.

An antipivot guide block 12 is secured to the bottom of adjustment block 104 and projects laterally therefrom. FIGS. 10 and 11 show a similar antipivot guide block 113 secured to the bottom edge of adjustment block 105.

The antipivot guide blocks 112, 113 are disposed in the same plane, and adjustably slide on a stationary horizontal mounting plate 114 that underlies the laterally movable plate 101.

With specific reference to FIG. 10 mounting plate 114 is adjustably mounted in a predetermined horizontal position by a plurality of vertical adjustment bolts 115 that are threadably received in the frame F. The mounting plate 114 is supported and locked into position by lock nuts 116 on each of the bolts 115.

A vertical support member 117 of angular cross section is rigidly secured at the left end of mounting plate 114 and a similar member 118 projects upwardly from the right end thereof. Guide plates 119, 120 are respectively secured to the top of the vertical support members 117, 118. The guide plates 119, 120 are horizontally disposed for sliding relation with the underside of the horizontal plate 101.

A laterally elongated slot 101a is formed through the mounting plate 101 in partial overlying relation with the guide plate 119, and a guide bolt assembly 121 carried by the plate 119 projects upwardly through the slot 101a ; in guiding relation. A similar slot 101b is formed in partial overlying relation to the guide plate 120, and the guide bolt assembly 122 projects therethrough.

As described, it will be appreciated that the elongated horizontal plate 101 is capable of sliding on the guide plates 119, 120 while being guided by the guide bolt assemblies 121, 122. At the same time, sliding support is offered to the antipivot guides 112, 113 by the mounting plate 114. This sliding movement is caused by rotation of the threaded shafts 108, 109, acting through the adjustment blocks 104, 105. Although the single belt 22 generally maintains a spaced, parallel relation with the dual belt 23, it is possible to individually adjust the handle wheels 16, 17 to permit optimum operation of the conveyor belts 22, 23 on the bakery products as they are moved sequentially over the length of the bed 21.

The lateral position of the disc cutter blade 36 relative to the conveyor belts 22, 23 is adjustable by structure shown in FIG. 3. Specifically, a cradle bearing the general reference numeral 131 is mounted at the side of frame F by support spacers 132. Cradle 131 comprises an elongated base 131a and upstanding opposed sides 131b and 131c. A pair of rods 133 (only one of which can be seen in FIG. 3) are mounted in side-by-side relation between the cradle sides 131b, 131c. A movable motor base 134 having four downwardly projecting legs 134a (only two of which may be seen in FIG. 3) is slidably mounted on the rods 133. An electric motor 135 having a vertically disposed output shaft 136 is mounted directly to the movable base 134. As shown in FIG. 2, the disc blade cutter 36 is mounted directly on the shaft 136.

With continued reference to FIG. 3, the movable base 134 includes a laterally projecting ear 134b which threadably receives a threaded rod 137. The threaded rod 137 is journaled into the upstanding side 131c; and carries a sprocket 138 at one end.

A blade adjustment shaft 139 is held in journaled relation to the frame F by a pair of bearings 140. The adjustment wheel 18 described in connection with FIG. 1 is mounted at one end, and an identical adjustment wheel 18 is mounted at the opposite end, so that the disc cutter blade 136 may be adjusted from either side of the machine 11.

Adjustable shaft 139 carries a sprocket 141 at an intermediate point and in alignment with the sprockets 138, and a chain 142 operably connects the sprockets. As either of the adjustment wheels 18 is rotated, the sprocket-chain drive causes rotation of the threaded rod 137, which in turn effects lateral movement of the movable base 134, motor 135 and disc cutter blade 36. By virtue of the range of sliding adjustment and the diameter of disc cutter blade 36, the blade 36 may be moved from a position in which it slices entirely through the bakery products through a range of positions having slices of various depth.

The disc cutter blade cleaning device 37, to which reference was generally made in connection with the description of FIG. 2, is shown in detail in FIGS. 12-15.

The drive for the cleaning device 37 is shown in FIG. 3, comprising an electric motor 151 and right angle gear drive 152 which are suitably supported by the frame F. The gear drive 152 has an output shaft 153 which projects vertically upward.

Figure 13:
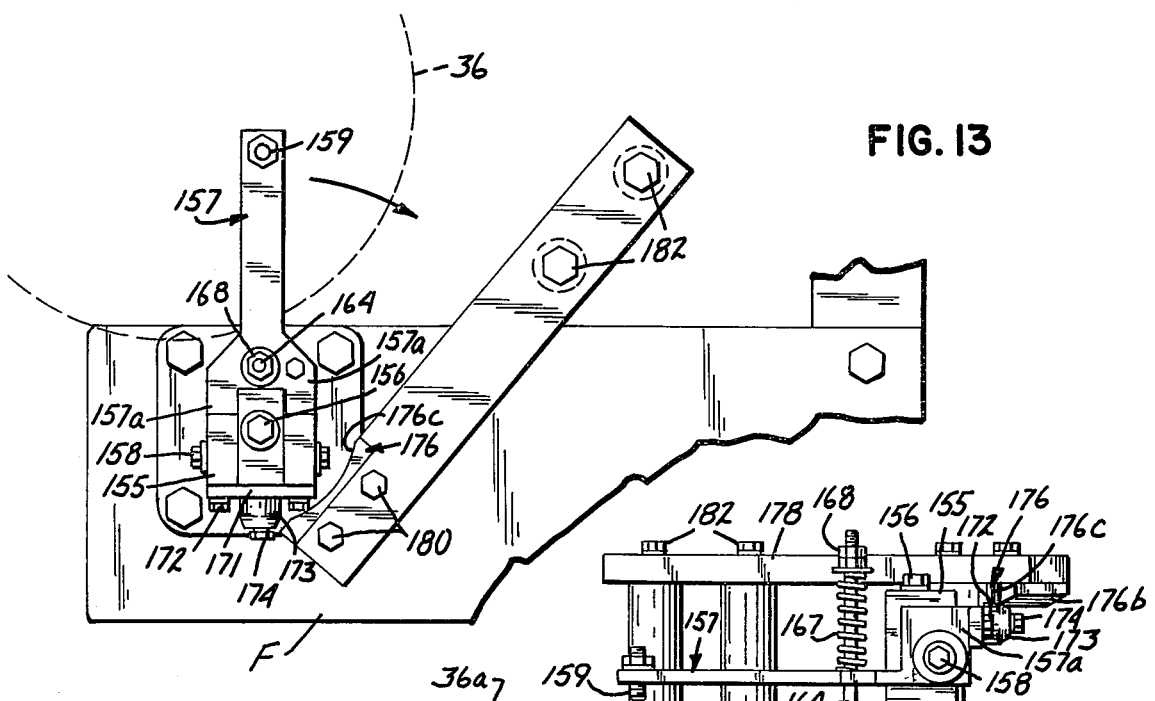
FIG. 13 is an enlarged fragmentary view in top plan of the disc blade cleaning device.
Figure 14:
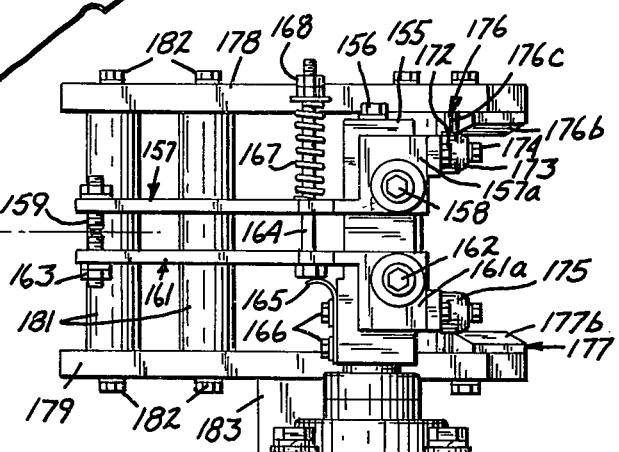
FIG. 14 is an enlarged fragmentary view of the disc blade cleaning device from the side thereof.
Figure 15:
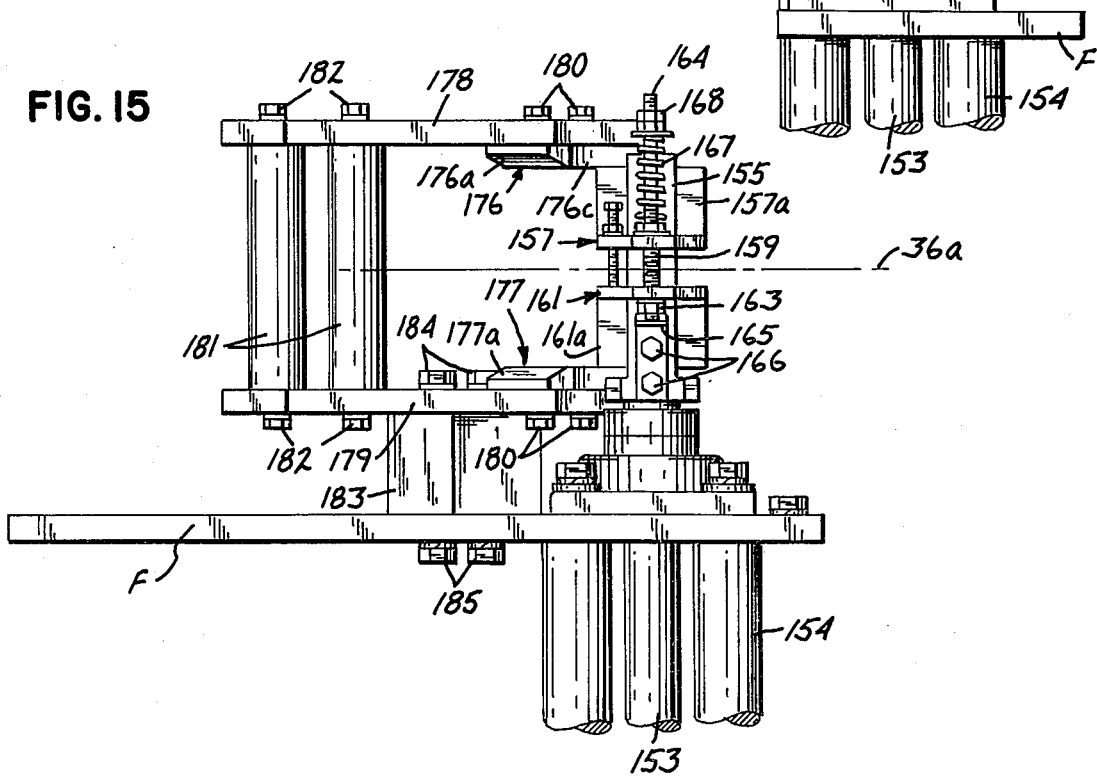
FIG. 15 is an enlarged fragmentary view of the disc blade cleaning device as viewed from the end thereof.

With reference to FIGS. 13-15, the output shaft 153 is journaled in a spacer 154 which is mounted on the frame F. An elongated, generally rectangular block 155 is mounted on the end of shaft 153 for rotation therewith by a bolt 156.

An upper arm 157 having bifurcated sides 157a is pivotally mounted to the elongated block 155 by a horizontal bolt 158. The extreme end of the arm 157 carries a blade scraper 159 which is stylus mounted and in the preferred embodiment takes the form of a bolt. It has been ascertained that a scraping device configured to expose a relatively strong force through a relatively small area scrapes and cleans the blade surface very efficiently. This is distinguished from a longitudinal surface such as a knife edge, which distributes the scraping force over a larger area, and which has been found to be inefficient for cleaning bakery product slicing blades of this type. Although the blade scraping bolt 159 does not taper to a sharp point, it does exert a relatively large force through a relatively small area and efficiently cleans the blade through a concentrated scraping process.

Since the scraping function is caused by metal on metal, it is preferred that the blade scraping bolt 159 be made from a material softer than the material of the blade 36. In this manner, the bolt, which is the lesser expensive of the two components, becomes expendable rather than the blade wearing out.

A lower arm 161 having bifurcated sides 161a is pivotally mounted to the elongated block 155 by a pivot bolt 162 below the arm 157. A blade scraper 163 is carried at the end of arm 161, projecting upward in direct opposition to the scraper 159. As shown in FIGS. 14 and 15, with the arms 157, 161 in a level position, the cleaning end of scrapers 159, 163 merge at the slicing plane 36a.

The arms 157, 161 are normally biased toward each other by a mechanism consisting of a bolt 164 extending vertically through both members, and the head of which is disposed on the underside of lower arm 161. The bolt head is held against the arm 161 by a steel spring 165 that is adjustably mounted on the front face of elongated block 155 by a pair of bolts 166.

A coil spring 167 fits over the bolt 164 above the upper arm 157 and is held in compression by a washer-nut assembly 168.

As described, rotation of the shaft 153 causes the elongated block 155 to rotate, carrying with it the upper and lower arms 157, 161 which sweep in a clockwise direction relative to the blade 36 (FIG. 13).

A small rectangular strap 171 is secured to the rear side of the bifurcated arms 157a by screws 172. A following roller 173 is centrally secured to the strap 171 by a screw 174 so that it rotates about a generally horizontal axis. A following roller 175 is similarly mounted onto the rear side of lower arm 161.

The rollers 173, 175 serve as cam followers that cooperate with a pair of cam blocks 176, 177 as the shaft 153 rotates and causes the arms 157, 161 to sweep in a clockwise direction. The cam blocks 176, 177 are respectively mounted at the end of a pair of horizontal support arms 178, 179. This mounting is by a plurality of screws 180, which permit adjustments to the position of cam blocks 176, 177.

The support arms 178, 179 are held in stationary, spaced parallel relation by a pair of spacers 181, to which they are secured by mounting bolts 182. The lower support arm 179 is secured to a spacer block 183 by mounting bolts 184, which establishes the proper elevational position of the scrapers 159, 163 relative to the blade plane 36a. The spacer block 183 is secured to the frame F by mounting bolts 185.

With reference to FIG. 13, the inside edge of the support arm 178 is formed with a shallow arcuate recess 178a to provide clearance between the arm 178 and the corner of the upper arm 157. A similar arcuate recess is formed in the lower arm 179.

The cam blocks 176, 177 are formed with entrance ramps 176a, 177a (FIG. 15) and exit ramps 176b, 177b (FIG. 14). The size and configuration of the cam blocks 176, 177 are designed to effect a spreading of the arms 157, 161 away from each other as they sweep in a clockwise manner toward the disc cutter blade 36, thus avoiding undesired contact of the scrapers 159, 163 with the serrated edge of the blade 36. This occurs as the rollers 173, 175 respectively engage the entrance ramps 176a, 177a. The exit ramps 176b, 177b are positioned to permit the arms 157, 161 to return to their normal positions engaging the blade 36 approximately one-half the distance of the arcuate sweep. Stated otherwise, the scrapers 159, 163 are permitted to engage the blade 36 at a midway point on the blade surfaces, which avoids duplication of the cleaning operation. At the point shown in FIG. 13, the roller 173 has just left the associated cam block 176, and the scraper 159 is in full engagement with the top surface of disc cutter blade 36. This engagement will continue over the remainder of the blade, and in the preferred embodiment the scrapers 159, 163 engage each other as they leave the opposite surfaces of the blade 36. It is also possible to provide cam blocks that cause the scrapers 159, 163 to leave the blade 36 before they reach blade edge, which prevents any possibility of blade dulling.

It is intended that operation of the cleaning device 37 be intermittent in nature. To that end, and with reference to FIG. 3, a limit switch 186 is mounted relative to a switch actuating arm 187 that rotates with the drive shaft 153. The angular position of actuating arm 187 is coordinated with that of the arms 157, 161, so that the device 37 stops shortly after the scrapers 159, 163 have moved out of engagement with the disc cutter blade.

FIG. 16 is a schematic representation of the electric control circuit for machine 11. The circuit includes a main disconnect switch 201 that is adapted to receive electrical power from a three-phase voltage source. The switch 201 supplies the blade motor 135 through three lines 202, 203, 204 that respectively include fuses F1, F2, F3 and overcurrent detectors B1, B2, B3. Each of the lines 202-204 also includes a relay contact M1-M3 the purpose of which is discussed below.

A transformer 205 has primary winding terminals connected to the lines 203 and 204. The secondary winding of transformer 205 is connected at one terminal to divided circuitry including a line 206 and a line 208. The other terminal of the secondary winding of transformer 205 is connected to a ground line 209.

Although not shown, a multiple tapped transformer can be used as known in the art to derive the voltages necessary for the electrical equipment disclosed.

Line 206 includes a relay contact M1 and a fuse F6 as shown, and is connected to a DC controlling circuit 211 that takes the form of a printed circuit board. A potentiometer 212 having a control knob on the control panel 15 is connected to the DC controlling circuit 211 by a loop circuit 213. The motor 91 which drives the single conveyor belt 22 is also connected to the controlling circuit 211 by a loop circuit 214, and its rotational speed can be varied by the potentiometer 212. A line 215 completes the circuit by connecting the controlling circuit 211 to the ground line 209.

A line 207 is tapped from the line 206 as shown and leads to a DC controlling circuit 216 similar to the controlling circuit 211. A potentiometer 217 is connected to the controlling circuit 216 through a loop circuit 218. The drive motor 53 for the dual conveyor belt 23 is connected to the DC controlling circuit 216 through a loop circuit 219 that includes a reversing switch 220. As such, the potentiometer 217 controls the rotational velocity of motor 53 through DC controlling circuit 216, and the reversing switch 220 controls the direction of rotation of motor 53. A line 221 completes the circuit from DC controlling circuit 216 to ground line 209.

Line 208 leads to a third DC controlling circuit 222 through a fuse F4 and a relay contact CR1. A potentiometer 223 is connected to controlling circuit 222 through a loop circuit 224, and the motor 151 that drives the blade cleaning device 37 is connected to the controlling circuit 222 through a loop circuit 225. As such, the potentiometer 223 controls the speed of motor 151 through the DC controlling circuit 222.

A line 226 serves as a series connection between line 208 and ground line 209 for a cover switch 227, a pair of blade stop switches 228, 229, a blade start switch 230, a scraper drive switch 231, a limit switch 186 and a time delay relay 232.

The cover switch 237 is of the mercury type, and is mounted on the inside of the hood H in a position to discontinue operation of the machine 11 when the hood H is raised.

The blade stop switch 228 is mounted on the control panel 15, and the blade stop switch 229 is mounted on the opposite side of the cabinet C in a position permitting the machine operator to control blade operation from either side. The blade stop switches 228, 229 are normally closed.

The blade start switch 230 is a normally open switch and operates in conjuntion with a latching circuit as described below. It is mounted on the control panel 15.

The scraper drive switch 231 is a two-position switch, one position for "on" and one position for "off," and is also mounted on the control panel 15.

The limit switch 186 is a double pole, single throw switch having one pole that is normally open and one pole that is normally closed. The normally open portion of the limit switch 186 is connected in the line 226, and is shown in a position in which it is held closed by the actuating arm 187. The normally closed portion of the limit switch 186 is discussed below.

A line 233 leads from a point between the switches 229, 230 to the ground line 209, and includes another set of relay contacts M1, a relay M1 and a set of normally closed, thermal overload switches 234. A line 235 connects the line 226 between the switches 230, 231 and the line 233 between the relay contacts M1 and the relay M1.

A line 236 taps into the line 208 and provides a series connection to a set of relay contacts TDR1 and the relay CR1 before connecting to the ground line 209. A line 237 provides a parallel connection to the line 236 for another set of relay contacts CR1 and the normally closed portion of the limit switch 186 (which is shown held open by the actuating arm 187).

A set of normally closed relay contacts M1 is connected in parallel with the normally open relay contacts CR1 by a line 238.

Operation of the machine 11 is described with reference to FIGS. 2 and 16. With machine operation underway, the conveyor belts 22, 23 move in the directions shown with power supply to the electrical control circuit through the main disconnect switch 201. The potentiometers 212, 217 are adjusted so that the single conveyor belt 222 moves at a greater linear velocity in the forward direction than the linear velocity of the dual belt 23, which normally moves in the opposite direction to impart controlled rotation to circular bakery products such as English muffins. This differential in linear velocities determines the speed at which the English muffins move over the bed 21 relative to the disc cutter blade 36, as well as their rotational speed. Preferably, the velocity differential is such that each English muffin is rotated 360° after engaging the blade 36 so that a full slice or score is made.

For products not capable of rotation, it is possible to reverse the direction of the dual conveyor belt 23 by the reversing switch 220. The linear speeds of the conveyor belts 22, 23 are then matched by adjusting the potentiometers 212, 217, enabling the bakery products to be sequentially carried forward relative to the disc cutter blade 36. The lateral position of blade 36 is controlled to effect the proper slice.

The blade 36 may also be fully retracted from the bakery product travel space, which permits the machine 11 to be used as a simple conveyor, rather than removing it from the product line when not in use.

Operation of the machine 11 is initiated by depressing the blade start switch 230. Assuming that the hood H is closed, so that the cover switch 226 is closed, and with the blade stop switches 228, 229 in their normally closed positions, a circuit is completed from the line 208 through the line 226 and connecting line 235 to the line 233 and on to the ground line 209. The resulting current flow energizes the relay M1, which closes each set of normally open relay contacts M1. Accordingly, power is supplied through the lines 202-204 to the blade drive motor 135. Simultaneously, the contacts M1 in line 206 are closed, providing power to the single conveyor belt drive motor 91 and the dual conveyor belt drive motor 53, which are controlled as described above.

The relay contacts M1 and line 233 also close, which establishes a latching circuit directly from the line 226 through the entirety of line 233. Thus, operation continues notwithstanding release of the blade start switch 230, which moves to its normally open position.

Operation of the cleaning device 37 for the disc cutter blade 36 is intermittent in the preferred embodiment. This operation is initiated by moving the scraper drive switch 231 to the "on" position. With the switches 227-229 closed, and with relay M1 energized, current flows through the line 226 and circumvents the blade start switch 230 through lines 233 and 235. Current thereafter flows through the line 226 to the normally open portion of limit switch 186. However, as pointed out above, when the cleaning device 37 is at rest, the actuating arm 187 engages the limit switch 186 and holds it in the position shown in FIG. 16. Accordingly, current flowing through the line 226 passes to the time delay relay 232.

Time delay relay 232 is a commercially available device. In the preferred embodiment, it can be adjusted to close from 0 to 8 minutes after the application of voltage. Upon actuation, the relay contacts TDR1 in line 236 close, energizing the relay CR1. This in turn closes the relay contacts CR1 in line 237, which has no effect since the normally closed portion of limit switch 186 is at this time held open by the actuating arm 187.

However, the relay contacts CR1 in line 208 are also closed by energization of the relay CR1, supplying electricity to the DC controlling circuit 222 and scraper drive motor 151. As soon as the motor 151 begins rotating, the actuating arm 187 moves out of contact with the limit switch 186. This stops the flow of current in line 226 to time delay relay 232, but at the same time closes the circuit including line 237, so that current maintains the relay CR1 in an energized state. As long as the relay CR1 is energized, electrical energy is supplied through the line 208 and the scraper drive motor 151 operates. Accordingly, both sides of the disc cutter blade 36 are cleaned by the sweeping, engaging motion of the blade scrapers 159, 163.

The actuating arm 187 also continues to rotate until the cycle is completed, at which time it re-engages the limit switch 186, causing the normally open portion in line 226 to close, and the normally closed portion in line 237 to open. Since the scraper drive switch 231 is in the "on" or closed position, electrical energy is again applied to the time delay relay 232 and the cycle repeats on this intermittent basis.

The normally closed relay contacts M1 in line 238 act as an automatic reset in the event that power is momentarily interrupted during a blade cleaning cycle. During normal operation, the relay M1 in line 233 is energized, and the relay contacts M1 in line 238 are open. When power is interrupted, these relay contacts M1 close, providing a bypass to the open contacts CR1. If the cleaning device 37 is in the middle of a cycle, the normally closed portion of limit switch 186 in line 237 is closed. However, the relay contacts TDR1 are open since the time delay relay 232 is in a state of delayed operation. Consequently, current flows from the line 236 through the line 238, through line 237 and returns to line 236 to energize relay CR1. This actuates the drive motor 151 as described above to complete the cycle.

What is claimed is:

1. Apparatus for slicing bakery products such as muffins to a predetermined depth, comprising:
    (a) a stationary bed surface for supporting the bakery products and over which the bakery products may be moved;
    (b) first and second longitudinal conveyor belt means disposed in generally parallel relation adjacent the stationary surface and spaced apart a distance permitting the bakery products to be carried therebetween sequentially over said stationary bed surface;
    (c) first drive means for moving the first belt means in a first direction at a first linear velocity;
    (d) second drive means for moving the second belt means in a direction opposite that of the first belt means and at a second linear velocity;
    (e) the first and second linear velocities being chosen to move the bakery products over said stationary surface in said first direction, and to cause each bakery product to rotate as it moves in said first direction;
    (f) and disc cutting means rotatable in a plane which is generally parallel to and spaced from the stationary bed surface, the disc cutting means projecting into the bakery product travel space between the first and second belt means, whereby each bakery product is sliced as it rotates and moves over said stationary bed surface in said first direction and into engagement with the disc cutting means.

2. The apparatus defined by claim 1, which further comprises means for laterally adjusting one of said first and second conveyor belt means relative to the other to vary the space therebetween and accommodate bakery products of various sizes.

3. The apparatus defined by claim 2, wherein said one belt means is the first belt means.

4. The apparatus defined by claim 1, which further comprises means for laterally adjusting the disc cutting means to vary the depth that the bakery products are sliced.

5. The apparatus defined by claim 4, wherein said lateral adjustment means is constructed to retract the disc cutting means to a position in which the bakery products are not sliced.

6. The apparatus defined by claim 1, which further comprises means for adjusting the stationary bed surface relative to the disc cutting means to vary the position of the slice on the bakery products.

7. The apparatus defined by claim 1, wherein at least one of the first and second drive means is constructed to adjustably vary the linear velocity of the associated belt means.

8. The apparatus defined by claim 1, wherein both of said first and second drive means are constructed to adjustably vary the linear velocity of their associated belt means.

9. The apparatus defined by claim 1, wherein the second drive means is constructed to reverse the direction of movement of the second conveyor belt means.

10. The apparatus defined by claim 1, wherein each of said first and second conveyor belt means comprises an endless conveyor belt.

11. The apparatus defined by claim 10, which further comprises means associated with each of said first and second conveyor belts for maintaining the belt tension essentially constant.

12. The apparatus defined by claim 1, wherein one of said first and second conveyor belt means comprises dual belts disposed for movement in the same operational plane relative to said disc cutting means, said dual belts being spaced apart with said disc cutting means projecting laterally therebetween for slicing engagement with the bakery products.

13. The apparatus defined by claim 1, wherein the disc cutting means comprises a serrated disc.

14. The apparatus defined by claim 1, which further comprises stationary hold-down means disposed above and generally parallel to the stationary bed surface for holding the bakery products against the bed surface as they are moved by the first and second conveyor belt means into engagement with the disc cutting means.

15. The apparatus defined by claim 14, wherein the hold-down means comprises a longitudinal plate and means for adjustably suspending the plate over said stationary bed surface.

16. The apparatus defined by claim 11, which further comprises tension releasing means associated with each of said endless belts for releasing tension on and permitting removal of the associated belt.

* * * * *

UNITED STATES PATENT AND TRADEMARK OFFICE
CERTIFICATE OF CORRECTION

PATENT NO. : 4,237,763

DATED : December 9, 1980

INVENTOR(S) : Frank D. Chipchase

It is certified that error appears in the above-identified patent and that said Letters Patent are hereby corrected as shown below:

Column 1, line 8, after the word "scoring" insert the word --bakery--.

Column 2, line 60, change the word "belt" to the word --belts--.

Column 6, line 31, after the numeral "71" insert the word --is--.

Column 7, line 66, "th" should be changed to --the--.

Signed and Sealed this

Nineteenth Day of May 1981

[SEAL]

Attest:

RENE D. TEGTMEYER

Attesting Officer    Acting Commissioner of Patents and Trademarks